June 14, 1932.  M. H. P. SOLOGAISTOA  1,862,912
COMBINED ELECTRIC IRON AND ELECTRIC STOVE
Filed May 2, 1929  4 Sheets-Sheet 1
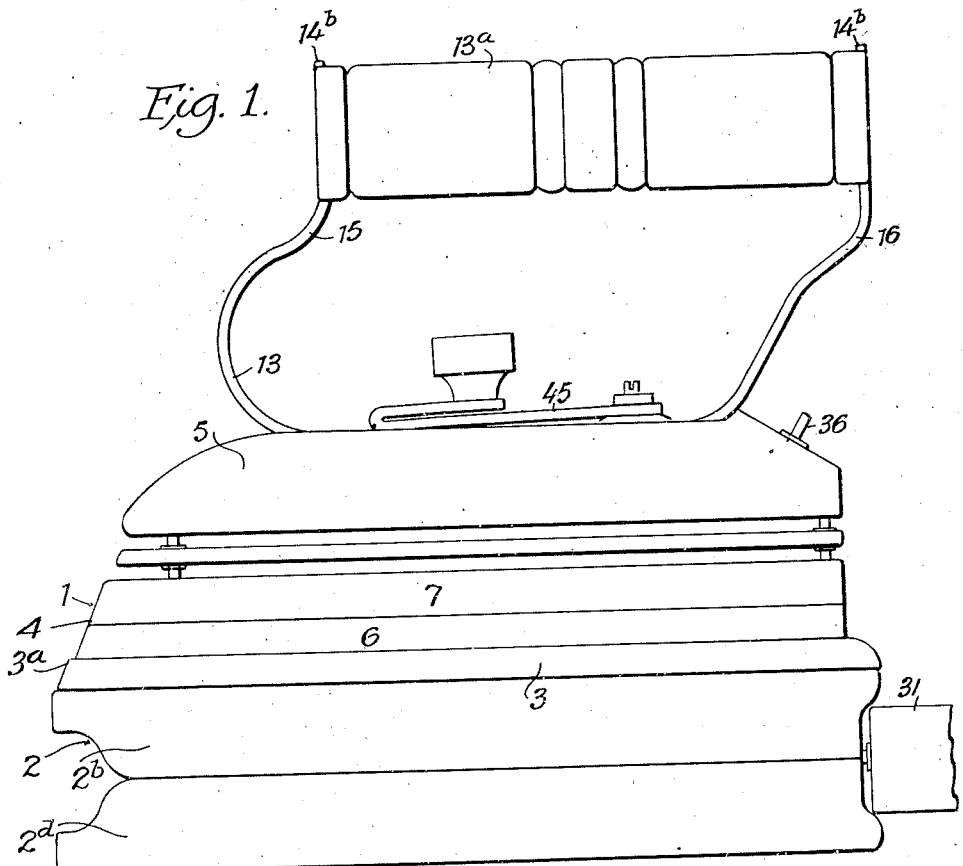
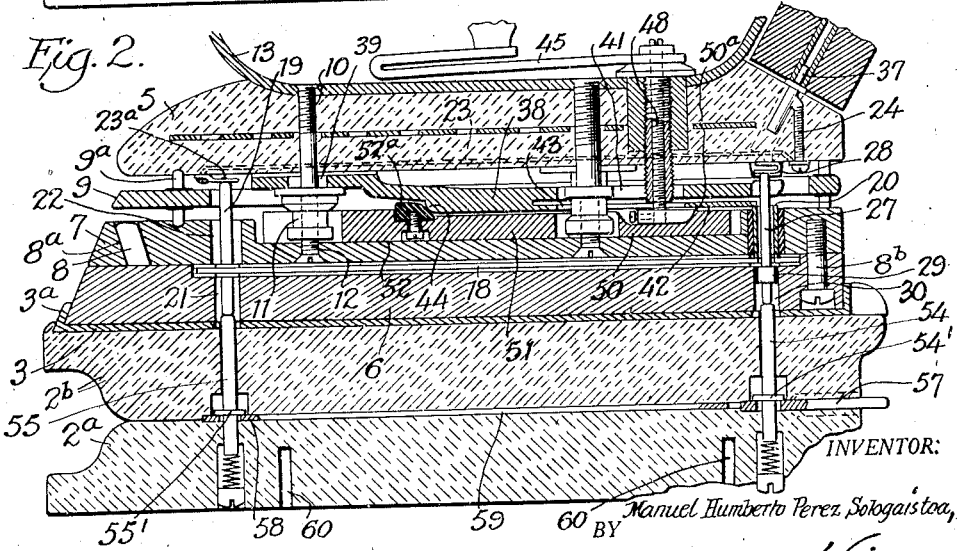
INVENTOR:
Manuel Humberto Perez Sologaistoa,
BY C. C. Hines,
ATTORNEY.

June 14, 1932. M. H. P. SOLOGAISTOA 1,862,912
COMBINED ELECTRIC IRON AND ELECTRIC STOVE
Filed May 2, 1929 4 Sheets-Sheet 2
INVENTOR:
Manuel Humberto Perez Sologaistoa,
BY
ATTORNEY.

June 14, 1932. M. H. P. SOLOGAISTOA 1,862,912
COMBINED ELECTRIC IRON AND ELECTRIC STOVE
Filed May 2, 1929   4 Sheets-Sheet 3
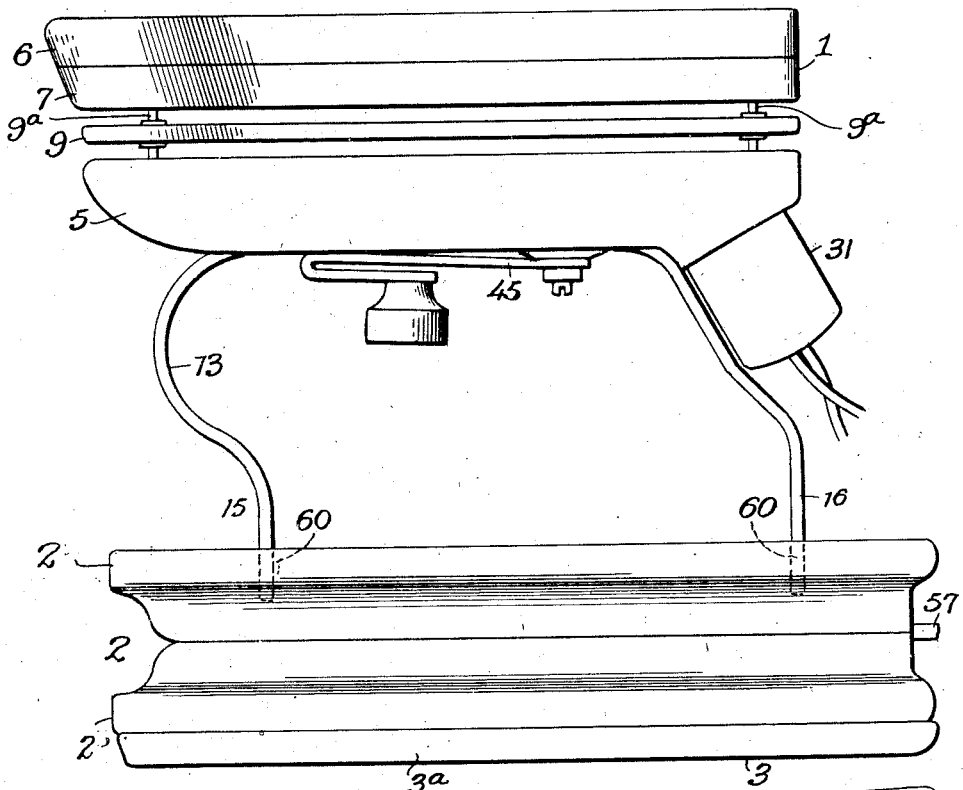
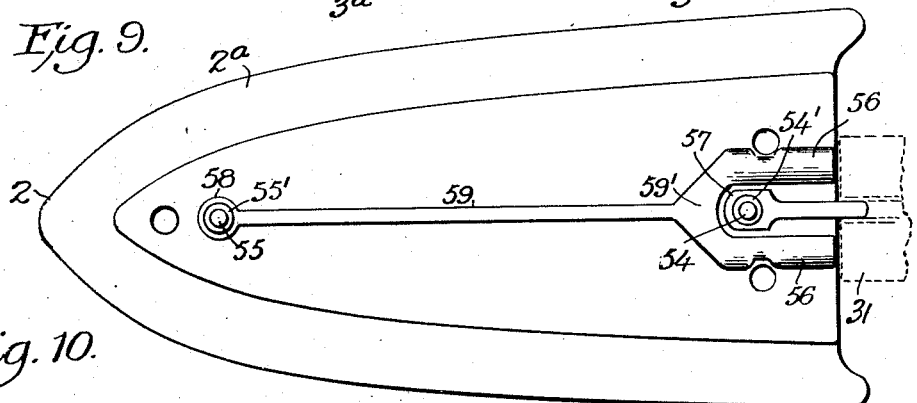
INVENTOR:
Manuel Humberto Perez Sologaistoa,
BY
ATTORNEY.

June 14, 1932.  M. H. P. SOLOGAISTOA  1,862,912
COMBINED ELECTRIC IRON AND ELECTRIC STOVE
Filed May 2, 1929    4 Sheets-Sheet 4
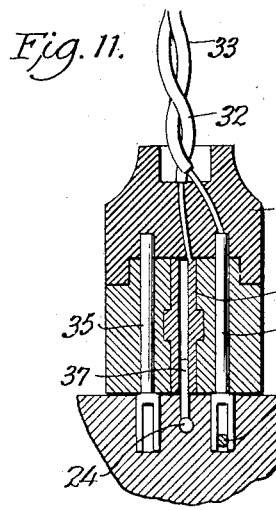
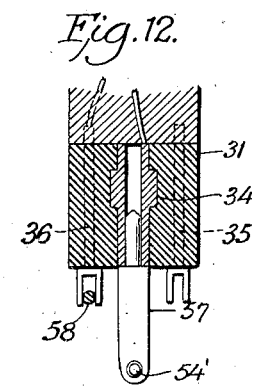
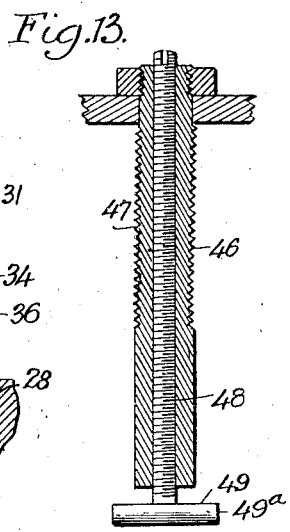
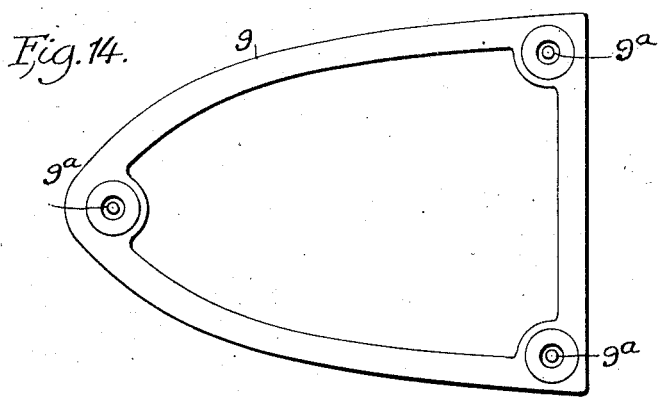
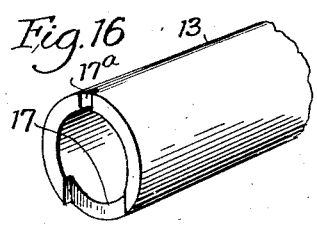
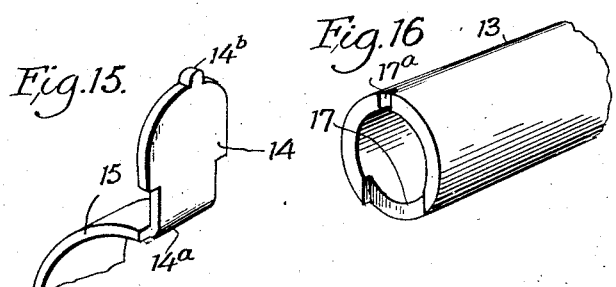
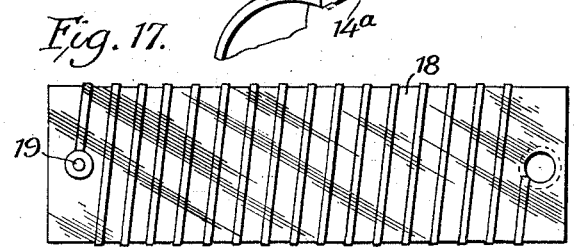
INVENTOR:
Manuel Humberto Perez Sologaistoa,
BY
ATTORNEY.

Patented June 14, 1932

1,862,912

UNITED STATES PATENT OFFICE

MANUEL HUMBERTO PÉREZ SOLOGAISTOA, OF SAN PEDRO SULA, HONDURAS, ASSIGNOR TO ADRIANA GUZMAN, OF NEW YORK, N. Y.

COMBINED ELECTRIC IRON AND ELECTRIC STOVE

Application filed May 2, 1929. Serial No. 359,851.

This invention relates to a combined electric iron and electric stove.

One object of the invention is to provide an iron whose resistance unit may be heated by means of a supply conductor connected either to the iron or to a stand for the iron, and wherein the iron is so constructed that it may be employed as an electric stove for cooking, heating or other purposes.

Another object of the invention is to provide an iron having novel means for variably regulating the temperature to which the iron is to be heated and for cutting off the supply of current when a maximum temperature is reached.

Still another object of the invention is to provide an iron which may be used without danger of burning the goods and without possibility or injury by current shocks to the operator.

The invention consists of the features of construction, combination and arrangement of parts, hereinafter fully described and claimed, reference being had to the accompanying drawings, in which:—

Fig. 1 is a side elevation of a combined electric iron and stove and a stand embodying my invention, showing the supply conductor connected with the stand.

Fig. 2 is a vertical longitudinal section through the iron and stand, showing the thermostatic switch in cut off position.

Fig. 3 is a bottom plan view of the top plate or part of the iron and parts carried thereby.

Fig. 4 is a top plan view of the bottom part of the iron and parts carried thereby.

Fig. 5 is a transverse section through the iron on the line of the regulator screw and its adjusting stem.

Fig. 6 is a section through the iron on the line of the contact pins at the heel end of the iron.

Fig. 7 is a detail section through the iron on an enlarged scale.

Fig. 8 is a view showing the device as employed as a stove.

Fig. 9 is a top plan view of the bottom section of the stand.

Fig. 10 is a rear end view of the same.

Fig. 11 is a sectional view of the conductor plug and part of the iron body.

Fig. 12 is a similar view of the plug and part of the stand.

Fig. 13 is a sectional view through the current controller.

Fig. 14 is a plan view of the spider or supporting and spacing rim.

Fig. 15 is a view of a part of the iron handle frame.

Fig. 16 is a view of a part of the handle.

Fig. 17 is a view of the resistance unit.

Referring now more particularly to the drawings, 1 designates the iron and 2 a supporting stand for the iron, which stand comprises horizontally divided sections $2^a$ and $2^b$ and a metallic seat plate 3, said plate being adapted to support the iron and provided with a flanged margin $3^a$ to surround the bottom portion of the iron body. The flanged margin of this plate serves as a guiding means to ensure the correct placing of the iron in position on the stand, for accurate engagement of the coacting electrical contacts, as hereinafter described, and to prevent displacement of the iron and disengagement of said contacts. The sections $2^a$ and $2^b$ of the stand may be made of porcelain or other good electric insulating material. Other features of construction of the stand will be set forth in the subjoined description.

The iron comprises a body part 4, which may be of conventional shape, and a top part 5. The body part 4 is made of a good heat conducting and radiating metal and consists of a base section 6 and a top section 7, detachably connected by an inclined stud 8 on the former engaging an inclined hole $8^a$ in the latter and coupling said sections at the front and a screw $8^b$ coupling said sections at the rear. The top part 5 is independent of and separated from the iron body by an open ventilating and supporting member or spider 9 carrying pins or studs $9^a$, whereby it is spaced from the body sections 5 and 7 to allow circulation of air between them, and whereby the part 5 is kept cool. The part 5 is made of porcelain or other good electric insulating material, while the member 9 for the purpose stated is made of some good heat conducting and radiating metal. Screws 10 extend through part 5 and have screw sockets 11 at their lower ends receiving screws 12 detachably securing the top part 5 to the top section 7, the upper ends of said screws 10 having threads engaging threaded openings in the section 5 and the base of a handle frame 13 allowing of the ready connection and disconnection of the aforesaid parts. The studs 9ª engage recesses in the parts 5 and 7 thereby holding part 9 in place and permitting of its removal when parts 5 and 7 are disconnected. The handle 13ª, which may be of any preferred construction, is detachably fastened to the frame 13. As shown, said handle is hollow or tubular and open at each end and is adapted to fit between and to be closed at its ends by a disklike closure and clamping heads 14 at the upper free ends of arms or standards 15, 16, forming part of the frame 13, said heads being connected with the standards by narrow neck portions 14ª. These two standards are resilient to cause the handle to be clamped between the heads and to permit the standards to be spread further apart to adapt the handle to be detached therefrom when desired. The ends of the handle are designed to receive and to be closed by the heads 14 and are notched, as at 17, to permit of such reception, and to receive the neck portions 14ª, whereby the handle is locked against rotation and lateral displacement. The handle thus mounted serves as a convenient reservoir to receive a screw-driver or other tools which may be needed at times to adjust or remove the fastening screws of the iron and for repairs or other similar purposes. Also the heads 14 are provided with locking pins 14ᵇ to engage recesses 17ª in the handle ends to obtain greater locking security.

The upper face of the iron body section 6 is recessed to receive a resistance unit 18, the terminals of which are respectively connected at their ends to a contact pin or rod 19 and a contact tube or bushing 20. The pin 19 lies out of electrical contact with or is insulated from the body sections 6 and 7, and the lower end of said pin extends downward into a bore 21 in section 6 and terminates just above the bottom face thereof, while the upper end of said pin extends upward through a bore 22 in section 7 through part 9 and engages a contact 23ª at one end of a conductor 23 mounted on the underside of part 5, the other end of which conductor is connected with a contact screw 24 embedded in the rear portion of part 5. The bushing 20 is insulated as at 25 from section 7 and spaced from another contact pin or rod 27, which extends therethrough. The upper end of this pin or rod 27 engages a contact piece 28 on part 5, while the lower end of said pin or rod is insulated from the body section 6, as at 29, and extends downward through a bore 30 therein and terminates adjacent to the bottom face of said section 6.

The contact piece 28 provides with the screw 24 contact terminals for coaction with a plug 31 to which the supply conductors 32 and 33 are connected. This plug is provided with a tubular contact member 34 embedded therein and a pair of prongs 35 and 36, which prongs have spring contact and retaining ends projecting beyond the plug and adapted to engage receiving bores formed for their reception in the contact piece 28. The tube 34 is electrically connected with the conductor 32, while the prong 36 is electrically connected with the conductor 33. The two prongs 35 and 36 serve as engaging members to hold the plug when fitted in position, the prong 35 serving only for this purpose in conjunction with the prong 36 and being electrically dead. On the part 5 and electrically insulated from the contact piece 28 is a pin or projection 37 electrically connected with the screw 24 and adapted to enter the conductor tube 34, to connect the conductor 33 at one end through the parts 24 and 37 to the feed conductor 32, while the prong 36 electrically connects the conductor 33 with the contact piece 28.

As shown, the opposite end of the conductor 23 is normally in engagement with the pin 19 and, through said pin, with one terminal of the resistance unit 18, forming one side of the electric circuit through the resistance, and a thermostatically controlled switch device 38 is provided for electrically connecting the contact piece 28 with the contact tube or bushing 20 so as to form the other side of the electric circuit and complete the circuit through the resistance.

The switch 38 is arranged on the underside of the part 5 in the space formed by the part 9 between the same and the part 7. Said switch comprises a bar of good conducting metal having at one end an opening 39 for passage of the forward screw 10 whereby it is pivotally mounted to rock upon the socket 11 of said screw and having at its opposite end a bifurcated contact piece or projection 40 for engagement with the contact piece 28. The free end of the switch provided with the contact piece 40, which is movable in a vertical plane, is formed adjacent to said contact piece with an opening 41 and carries on its underside a thin contact spring 42 secured at one end to the switch and having its opposite end free and adapted for engagement with the contact tube or bushing 20. The spring 42 is formed with an opening 43 in alinement with the opening 41 and the switch 38 is provided adjacent its pivoted end with an inclined or beveled surface or abutment 44. The free end of the spring 42 is designed through the resiliency of said spring to maintain a constant engagement with the contact tube or bushing 20, as long as part 5 remains connected with the iron body, while permitting movement of the switch for the engagement of the contact 40 with and its disengagement from the contact piece 28.

Mounted on the part 5 is a switch regulator comprising a laterally swinging lever 45 which is provided at one end with an angular opening receiving the angular portion of a stem 46 extending downwardly through the threaded opening in the part 5 and having screw threads 47 for engagement therewith. This stem also projects downward through the openings 41 and 43 in the switch and contact spring and has a threaded bore extending longitudinally therethrough for the reception of an adjusting screw 48 having threads finer than the threads 41 and carrying at its lower end a head 49 adapted to seat within a socket or recess 50 formed in one end of a thermostatic bar 51, and having a beveled end 49$^a$ to engage a beveled end wall 50$^a$ of said socket. The thermostatic bar is slidably mounted in a recess 52 in the section 7 and expansible and contractible therein and carries at its opposite end a beveled contact member or abutment 52$^a$ of insulating material, for engagement with the abutment 44 of the switch 38. Through a swinging movement of the lever 45 the regulator screw 46 may be turned to a greater or less extent to cause the end 49$^a$ of head 49 to engage to a greater or less degree with the sloping wall 50$^a$ of the recess 50, for the purpose of sliding the bar 51 rearwardly to a greater or less extent and, in this action, to rock the switch 36 so as to throw its contact 40 into engagement with the contact 28 and simultaneously adjust the bar 51 to regulate its degree of expansion before said bar can release the switch for a downward movement or cut off action. The pin 48 is provided at its upper end with a nick or the like to receive a screw driver blade whereby the head 49 may be adjusted relatively to the beveled wall of the recess 50 to compensate for wear and to provide for a sensitive and accurate control of the switch member by the thermostatic bar. The thermostatic bar may be made of a single piece of metal having a certain range of expansion and contraction between predetermined heat units, or it may be made of a composite structure of metals having the degree of expansion and contraction required. The greater the extent of downward adjustment of the head 49, or the deeper it seats in the recess 50, the greater will be the extent of expansion of the bar 51 required for movement of abutment 52$^a$ away from abutment 44 to permit the switch member 38 to drop for a current cut off action, so that by proper adjustment of the regulating device the current may not only be let on and cut off but an automatic cut off obtained at any predetermined temperature, so as to prevent the iron from heating beyond any predetermined degree. The iron may therefore be used without liability of scorching clothes or of burning clothes or anything with which it is in contact in the event that the iron should be left unattended with the switch on. It will be observed that the openings 41 and 43 permit the regulator screw 46 to be turned without interfering with the vertical movements of the switch 38, and that the use of the spring contact 42 allows movement of the switch without breaking contact between the spring 42 and the tube 20 which is kept constant through the resiliency of the spring.

Fitted in the base 2 are spring-pressed vertically movable contact pins 54 and 55 which projects up through the plate 3 for engagement with the lower ends of the contact pins 19 and 27 when the iron is set upon the stand. The base 2 is provided with socket tubes 56 to receive the prongs 35 and 36 of plug 31 and a contact member or pin 57 for connecting the contact tube 34 of the plug with the contact pin 54. The pins 54 and 55 are provided with contact heads 54′ and 55′ for engagement respectively with a contact 58 and the pin 57 and said pins are held by their springs elevated to maintain the heads 54′ and 55′ out of engagement with the contact 58, 57 until said pins 54, 55 are engaged and depressed by pins 19, 27 when the iron is placed on the stand. A conductor 59 leads from the contact 58 to a bridge 59′ joining the socket tubes 56, whereby when contacts 19, 55, 58 and 27, 54 and 57 are engaged an electrical circuit may be completed through the plug prongs 35, 36, tubes 56, conductor 59, contacts 55 and 19, contact 23$^a$, conductor 23, contact 28, the switch 38, when closed, the resistance unit 18, and the contacts 27, 54, 57 and tube 34, as will be readily understood. The switch and thermostatic device may then be used in the manner before described for the purpose of controlling the supply of current to heat the iron with all parts applied and through electrical connections mounted on the stand. The iron so heated may, of course, be removed from the stand when heated to the desired degree and used for ironing without the annoyances, etc., resulting from having a conductor cord attached thereto, or the iron may be left on the stand for continuous heating and use as a stove for heating a small room or a receptacle or container in which it is placed. In the underside of part 2$^a$ of the stand are sockets 60 of a form to receive the heads 14 of the iron handle frame. On removing the handle 13$^a$ and inverting the stand 2 and the iron 1, the heads 14 may be engaged with sockets 60 to support the inverted iron on the inverted sand, as shown in Fig. 8. With this arrangement the device may be used as a hot plate for cooking and analogous purposes, utensils being rested upon the inverted bottom surface of the part 6, as will be readily understood.

From the foregoing description, it will be seen that the invention provides a combined electric iron and electric heating stove or cooking stove in which the resistance, arranged within the iron body, may be heated by current supplied from a line conductor applied by connecting the plug with a receiving socket upon the iron or a receiving socket upon the iron stand. The iron may be heated in either of these ways either for use for laundry or pressing purposes or for use as an electric stove. The plug connection with the iron not only allows the iron to be heated when supported upon any type of stand, other than one of the type disclosed, but also adapts the iron to be heated when in use and for continued use in the event that the operator is willing to contend with the inconveniences incident to the manipulation of a conductor cord, which may be necessary in ironing very heavy and wet fabrics. By connecting the plug with the stand socket, however, the iron may be heated until heated to the desired degree and may then be used for ironing or pressing purposes without the inconveniences of an attaching cord. As stated, the iron may be employed as a heater for heating a small room or cabinet without removal of any of its parts, the heat being radiated from the iron body and the supporting member 9, or by the arrangement of the parts shown in Fig. 8, the iron may be used as a hot plate for cooking purposes. It will be obvious, of course, that by means of the current regulator the supply of current to the iron may be let on or cut off, with the plug applied to either socket, and that by means of the regulator the action of the switch and thermostatic bar may be controlled to cut off the current when the iron is heated to any predetermined degree, so as to avoid scorching or burning of goods or the danger of a fire being started in the event that the iron is left unattended.

Having thus fully described my invention, I claim:—

1. In an electric iron, an iron body, a top plate above the iron body, an apertured spacing element between the iron body and the top plate forming an enclosed chamber, said top plate being removable from the iron body, a heating unit carried by the body below the spacing element, means for supplying current to the coil, and a thermostatic switch device disposed in said chamber and the aperture of the spacing element and governing the flow of current to the unit.

2. A combined electric iron and stove or hot plate comprising an iron body, a heating unit carried by the iron body, said body having a surface above the heating unit for supporting a utensil to be heated by said unit, a removable top for the iron body normally covering said surface and adapted upon removal to expose the same, a stand on which the iron body may be rested, and electrical connections on the removable top section and the stand whereby a current conductor may be applied to either the said removable top section or the stand for supplying current to the heating unit.

3. In an electrically heated iron, an iron, a stand for said iron, a heating unit for said iron including contacts exposed through the face of the iron, and means carried by the stand for supplying current to the heating unit when the iron is resting therein including conductors mounted in the base, contacts to engage said conductors slidably mounted in sockets formed in the base and opening through the upper face thereof, and resilient means yieldably holding the contacts in a raised circuit breaking position out of engagement with the conductors and permitting depression thereof to a circuit closing position when engaged by contacts of the iron.

4. In an electrically heated iron, an iron, a stand for said iron, a heating unit for said iron including contacts exposed through the face of the iron, the stand being formed with vertically extending sockets opening through its upper face, conductors carried by said stand and having outer ends adapted for connection with power wires, contact pins slidably received in said sockets and having portions to engage said conductors to complete a circuit when the pins are in a depressed position, and springs in said sockets engaging lower ends of said pins and supporting the same in an elevated current breaking position out of engagement with the conductors until the pins are depressed by engagement with contacts of the iron when the iron is set upon the stand.

5. In an electrically heated iron, an iron, a stand for said iron, a heating unit for said iron including contacts disposed in sockets formed in the iron and opening through the face thereof, said contacts terminating short of the plane of the face of the iron, and means carried by the stand for supplying current to the heating unit when the iron is resting upon the stand including contact pins projecting upwardly from the upper face of the stand to enter the sockets and engage the contacts of the iron when the iron is set in place upon the stand.

6. In an electrically heated iron, a body having upper and lower sections, a resistance betweeen said sections, a top mounted above said body releasably connected with the upper section and held in spaced relation thereto, a thermostatic switch device between the top member and upper section of said body connected in series with said resistance, passages being formed vertically through the upper and lower sections, and contact pins extending through said passages with their lower ends exposed for engagement with contacts carried by a stand when the iron is not upon the stand.

7. In an electrically heated iron, a body having upper and lower sections, a resistance between said sections, a top mounted above said body releasably connected with the upper section and held in spaced relation thereto, a thermostatic switch device between the top member and upper section of said body connected in series with said resistance, adjusting means for the switch device including a stem extending upwardly through the top member and having an actuating element at its upper end, and contact pins associated with the resistance and switch device and extending through passages formed vertically through the body with their lower ends exposed for engagement with contacts carried by a stand when the iron is not upon the stand.

In testimony whereof I affix my signature.

MANUEL HUMBERTO PÉREZ SOLOGAISTOA.